(12) United States Patent
Takase

(10) Patent No.: US 7,724,451 B2
(45) Date of Patent: May 25, 2010

(54) LENS ASSEMBLY AND IMAGING DEVICE

(75) Inventor: Yoshiyuki Takase, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 302 days.

(21) Appl. No.: 12/016,002

(22) Filed: Jan. 17, 2008

(65) Prior Publication Data
US 2008/0218882 A1  Sep. 11, 2008

(30) Foreign Application Priority Data
Mar. 6, 2007 (JP) .......................... P2007-055076

(51) Int. Cl.
*G02B 7/02* (2006.01)

(52) U.S. Cl. .................... 359/811; 359/819; 359/830; 348/335; 348/E5.028

(58) Field of Classification Search ............... 359/811, 359/819, 820, 823, 830, 363, 644, 668, 699, 359/798; 396/25, 348, 349, 428, 529; 348/335, 348/342, 360, E5.028; 369/275.1
See application file for complete search history.

(56) References Cited

U.S. PATENT DOCUMENTS 4,816,860 A * 3/1989 Iida et al. ...................... 396/80
5,969,887 A * 10/1999 Hagimori et al. ............. 359/819
6,507,700 B1 * 1/2003 Takekuma et al. ............. 396/25
7,433,136 B2 * 10/2008 Ichikawa et al. ............. 359/811
7,609,322 B2 * 10/2009 Takada ......................... 348/374

FOREIGN PATENT DOCUMENTS

| JP | 8-136783 A | 5/1996 |
|---|---|---|
| JP | 11-223755 A | 8/1999 |
| JP | 2001-51176 A | 2/2001 |
| JP | 2003-35854 A | 2/2003 |
| JP | 2004-233697 A | 8/2004 |
| JP | 2005-338218 A | 12/2005 |

* cited by examiner

*Primary Examiner*—Loha Ben
(74) *Attorney, Agent, or Firm*—Birch, Stewart, Kolasch & Birch, LLP

(57) ABSTRACT

A lens assembly includes: a lens group including a plurality of lenses; and a lens holder accommodating the lens group and having an opening in each of a front end face of the lens holder and a rear end face of the lens holder. The opening of the front end face has a smaller diameter than an outer diameter of a foremost lens accommodated in a foremost end face side of the lens holder, the lens holder includes a spacer ring disposed on a rear side of a rearmost lens accommodated in a rearmost end face side of the lens holder, the spacer ring abutting on a peripheral portion of the rearmost lens to keep a space between a rear face of the rearmost lens and the rear end face of the lens holder, and the lens holder holds a rear face of the spacer ring by thermal caulking.

4 Claims, 6 Drawing Sheets

THERMAL CAULKING

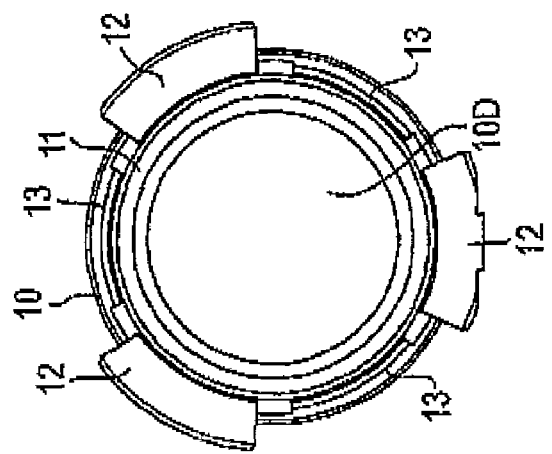
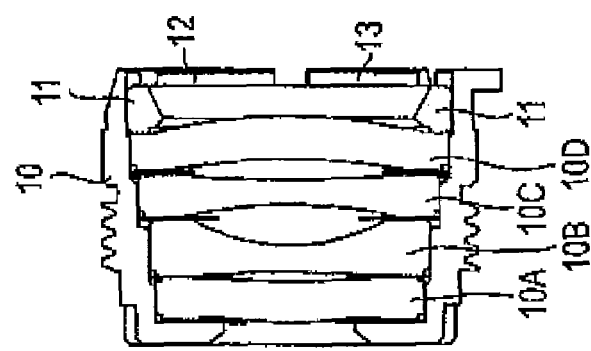
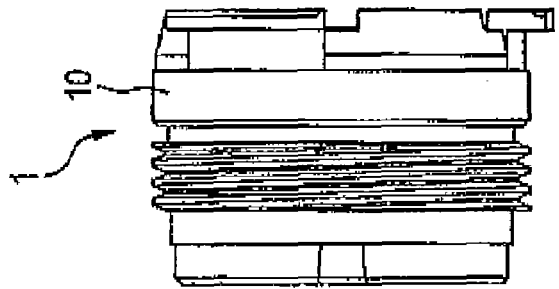
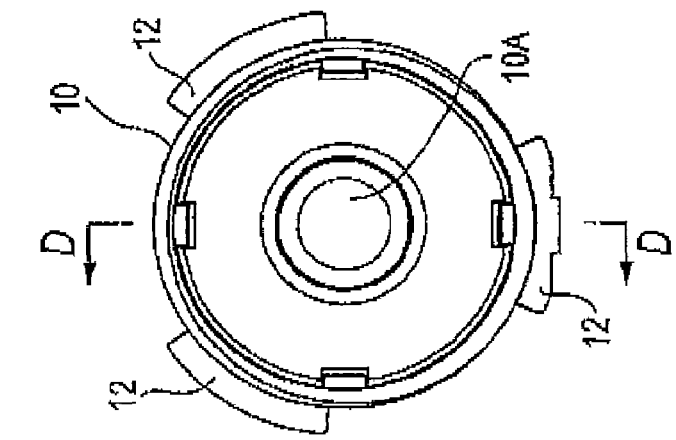

LENS ASSEMBLY AND IMAGING DEVICE

BACKGROUND OF THE INVENTION

1. Field of the Invention

The present invention relates to a lens assembly for accommodating a plurality of lenses and an imaging device having the lens assembly.

2. Description of Related Art

There is known a lens assembly in which an imaging lens for imaging subject light to a sensor of an imaging element or the like is internally incorporated. Among such a lens assembly, there is a lens assembly in which the miniaturization is promoted by simplifying a structure of an engaging portion of a lens holder and a lens frame by providing a male screw and a female screw to be precisely screwed together in the lens holder and the lens frame, and both optical axis alignment and focus adjustment is simply performed by threading the lens frame into the lens holder. Since this structure is highly miniaturized, the lens assembly is suitable to be mounted in a portable device, a vehicle, or the like.

When a mechanism for fixing the lens frame is additionally provided in a microminiature lens assembly, a size of the lens holder increases. Accordingly, the lens frame is mostly fixed to the lens holder by an adhesive. For this reason, a small adhesive reservoir is usually provided to receive an extra adhesive.

However, in the present situation, the small adhesive reservoir may not be provided in the lens holder in keeping with the further miniaturization of a portable device in the above-described microminiature lens assembly. If the adhesive reservoir may not provided in the lens holder, the adhesive is attached to a lens surface when the extra adhesive flows into a lens portion as long as a worker does not exceptionally carefully perform an operation.

On the other hand, since the use of plastic for a case of a portable device or the like is recently increasing, it is considered to promote the simplification of assembly by caulking a part of the case through thermal caulking after members are loaded within the plastic case, so as to hold the members inside the case.

When a thermal caulking technique like a technique of JP-A-8-136783 can be applied to the above-described lens assembly, the work is further comfortable and the work efficiency is improved. However, there is an issue that a plastic lens, which becomes mainstream as a lens material, inside the lens holder may be deformed when thermal caulking is performed.

When the plastic lens is manufactured by injection molding, a finished shape of the lens becomes a D-cut shape as shown in FIG. 1 since an arrangement portion of a gate for injecting resin into a molding tool is necessarily placed within an outer shape of the lens.

FIG. 1 is views showing a plastic lens 21 of a D-cut shape and an outer appearance when the plastic lens 21 is placed in a rear end face side of a tons holder 20 provided in a lens assembly 2.

When the plastic lens 21 of the D-cut shape shown in FIG. 1 is accommodated in the rear end face side of the lens holder 20, a space is generated between the lens holder 20 and a D-cut portion of the plastic lens 21 as shown in FIG. 1. For this reason, there is an issue that the lens holder 20 is bumpy and the lens holder itself is deformed when a leading end of a tool is put around the space so as to perform thermal caulking from the rear end face side of the lens holder 20 using a caulking tool.

SUMMARY OF THE INVENTION

An object of an illustrative, non-limiting embodiment of the invention is to provide a lens assembly in which thermal caulking can be simply and surely performed even when a plastic lens is located inside a lens holder and to provide an imaging device having the lens assembly.

According to an aspect of the invention, there is provided a lens assembly including: a plurality of lenses; and a lens holder accommodating the plurality of lenses and having an opening in each of a front end face of the lens holder and a rear end face of the lens holder, wherein the opening of the front end face of the lens holder is an opening of a smaller diameter than an outer diameter of a lens accommodated in a foremost end face side of the lens holder (a foremost lens), a spacer ring is disposed on a rear side of a lens accommodated in a rearmost end face side of the lens holder (a rearmost lens), the spacer ring abutting on a peripheral portion of a rear face of the lens accommodated in the rearmost end face side to keep a space between the rear face and the rear end face of the lens holder, and the lens holder holds a rear face of the spacer ring by thermal caulking.

According to the lens assembly as described above, when caulking by thermal caulking is performed from a rear face of the spacer ring accommodated in a rear end side of the lens holder in a state in which the lens accommodated in the foremost end face side within the lens holder abuts on an opening side of the front end face of the lens holder, the spacer ring is held by the lens holder and a plurality of lenses are accommodated within the lens holder, According to the above-described configuration, it is difficult for the heat to be transferred to a plastic lens even when thermal caulking is performed from the rear end face side since the spacer ring is inserted into the rearmost end face side and the spacer ring operates as a buffer member with the plastic lens, and the deformation of the plastic lens inside the lens holder is prevented. Moreover, the deformation of the lens holder itself is prevented since the flatness of a portion caught in a leading end of a thermal caulking tool is maintained by the spacer ring inserted into a more rear end face than a plastic lens of a D-cut shape even when the plastic lens of the D-cut shape is located in the rear end face side of the lens holder.

Since the plurality of lenses are accommodated within the lens holder by thermal caulking as described above, an unnecessary accommodating mechanism does not need to be provided in the lens holder, such that the miniaturization of the holder itself can be promoted.

The lens holder may have a plurality of reference planes in the rear end face of the lens holder, intermittently surrounding of the opening of the rear end face. The reference planes serve as a basis for optical position adjustment of the lens group. The lens holder holds the spacer ring by thermal caulking between the reference planes.

In a lens holder of the background art, a base plane for optical axis adjustment approximately orthogonal to an optical axis of the lens is mostly provided in a backward end face such that the optical axis of the lens within the lens holder in contact with the base plane of a lens mount on an imaging element side can be oriented in a correct direction so as to incorporate the lens holder in an imaging device. In an aspect of the present invention, a plurality of reference planes are formed in a plurality of places by intermittently notching the base plane and the notches serve as claws for thermal caulking, and thermal caulking can be performed while aligning an optical axis direction of lenses with respect to the plurality of reference planes intermittently formed.

Since the lens holder holds the spacer ring by thermal caulking between the reference planes of the lens holder, the rear end face accommodated in the lens holder is almost the same as the reference planes, such that the plurality of lenses within the lens holder can be aligned and accommodated within the lens holder in a state in which the optical axis direction is correctly oriented in a direction approximately orthogonal with respect to the reference planes. After the lens holder holds the plurality of lenses by thermal caulking, the reference planes can be used as die basis upon mounting in a camera cone or the like.

Since the spacer ring is inserted into the rear end face side of the lens holder as described above, at least the lens accommodated in a rearmost end face side of the lens group can be a plastic lens.

According to an aspect of the invention, there is provided an imaging device including: a lens assembly of the present invention; and an imaging element.

According to an imaging device of the present invention, the miniaturization of the imaging device by incorporating a miniaturized lens assembly in the imaging device can be promoted.

BRIEF DESCRIPTION OF THE DRAWINGS

The features of the invention will appear more fully upon consideration of the exemplary embodiment of the invention, which are schematically set forth in the drawings, in which:

FIGS. 4A to 4D are a front view, a side view, a D-D arrow view, and a rear view of the lens holder 10 of FIG. 3, respectively, when the right of the lens holder 10 of FIG. 2 is the front side;

DETAILED DESCRIPTION OF THE EXEMPLARY EMBODIMENTS

Although the invention will be described below with reference to exemplary embodiments thereof, the following exemplary embodiments and modifications do not restrict the invention.

According to an exemplary embodiment of the invention, a lens assembly in which thermal caulking can be simply and surely performed even when a plastic lens is internally located and an imaging device having the lens assembly, can be realized.

Hereinafter, exemplary embodiments of the present invention will be described with reference to the accompanying drawings.

Figure 2:
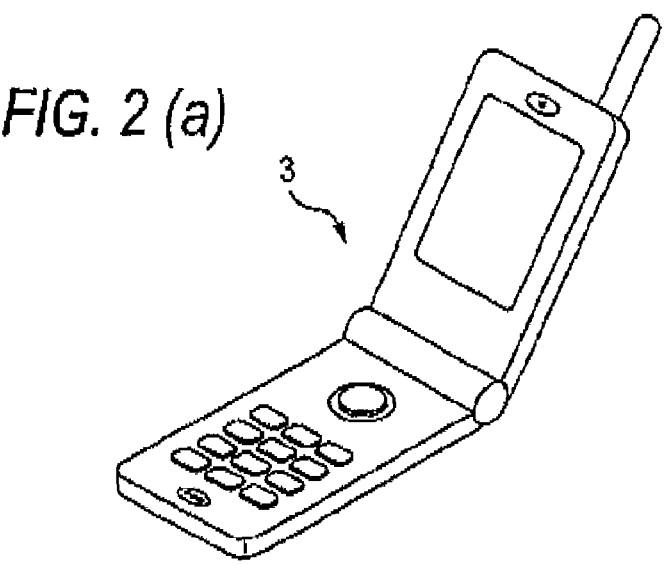
FIGS. 2A and 2B show an outer appearance of a camera-equipped mobile phone serving as an exemplary embodiment of an imaging device in which a lens assembly 1 of the present invention and an imaging element are incorporated.
FIG. 2C shows an imaging device incorporated in the mobile phone.
Figure 2:
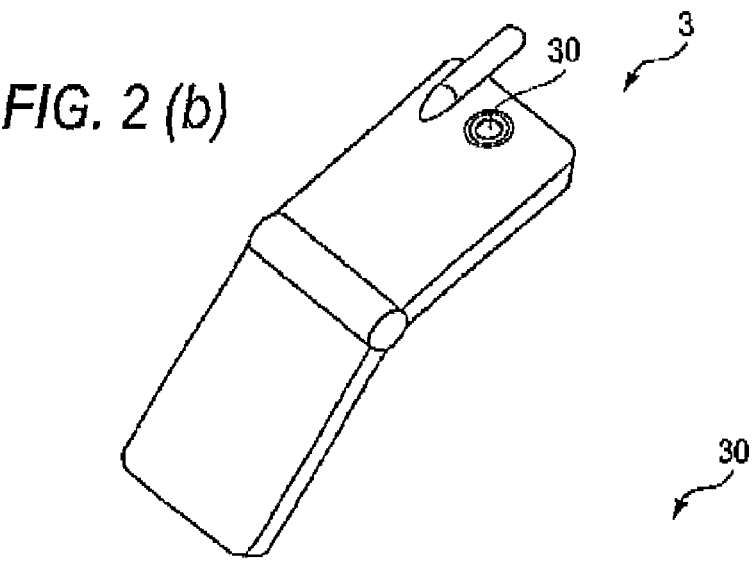
Figure 2:
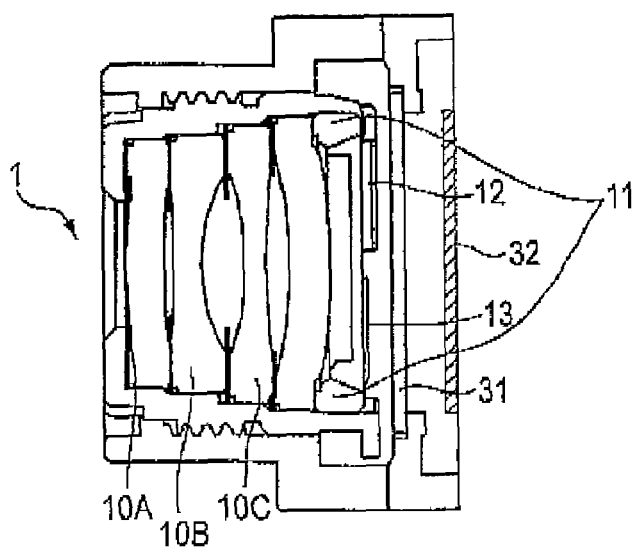

FIG. 2 is a view showing an outer appearance of a camera-equipped mobile phone 3 serving as an embodiment of an imaging device in which a lens assembly 1 of the present invention and an imaging element are incorporated. An imaging device 30 shown in FIG. 2C is incorporated in the camera-equipped mobile phone 3 shown in the FIGS. 2A and 2B. In the imaging device 30 shown in FIG. 2C, the lens assembly of the present invention, a cover glass 31, and an imaging element 32 are provided.

Figure 3:
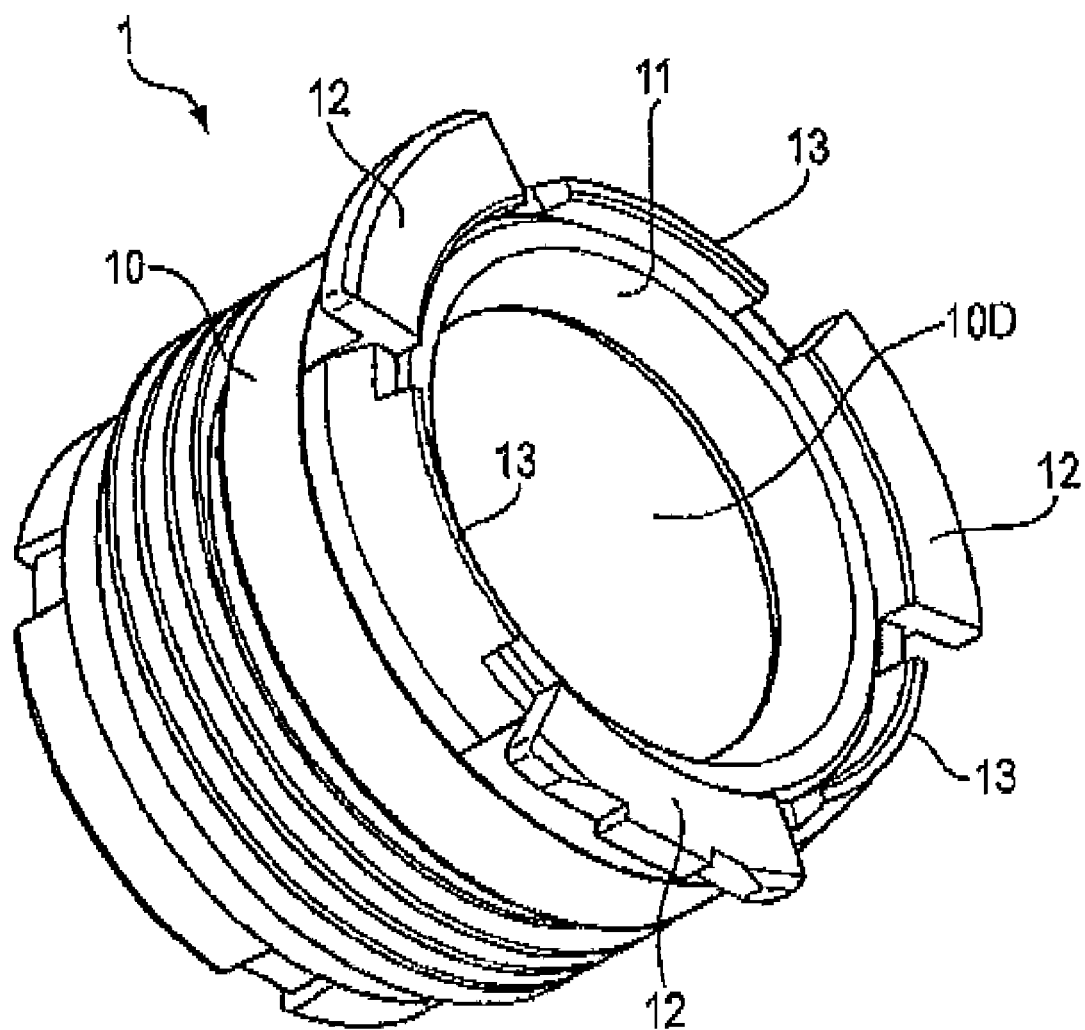
FIG. 3 shows an outer appearance of a lens holder 10 before thermal caulking is performed.
Figure 5:
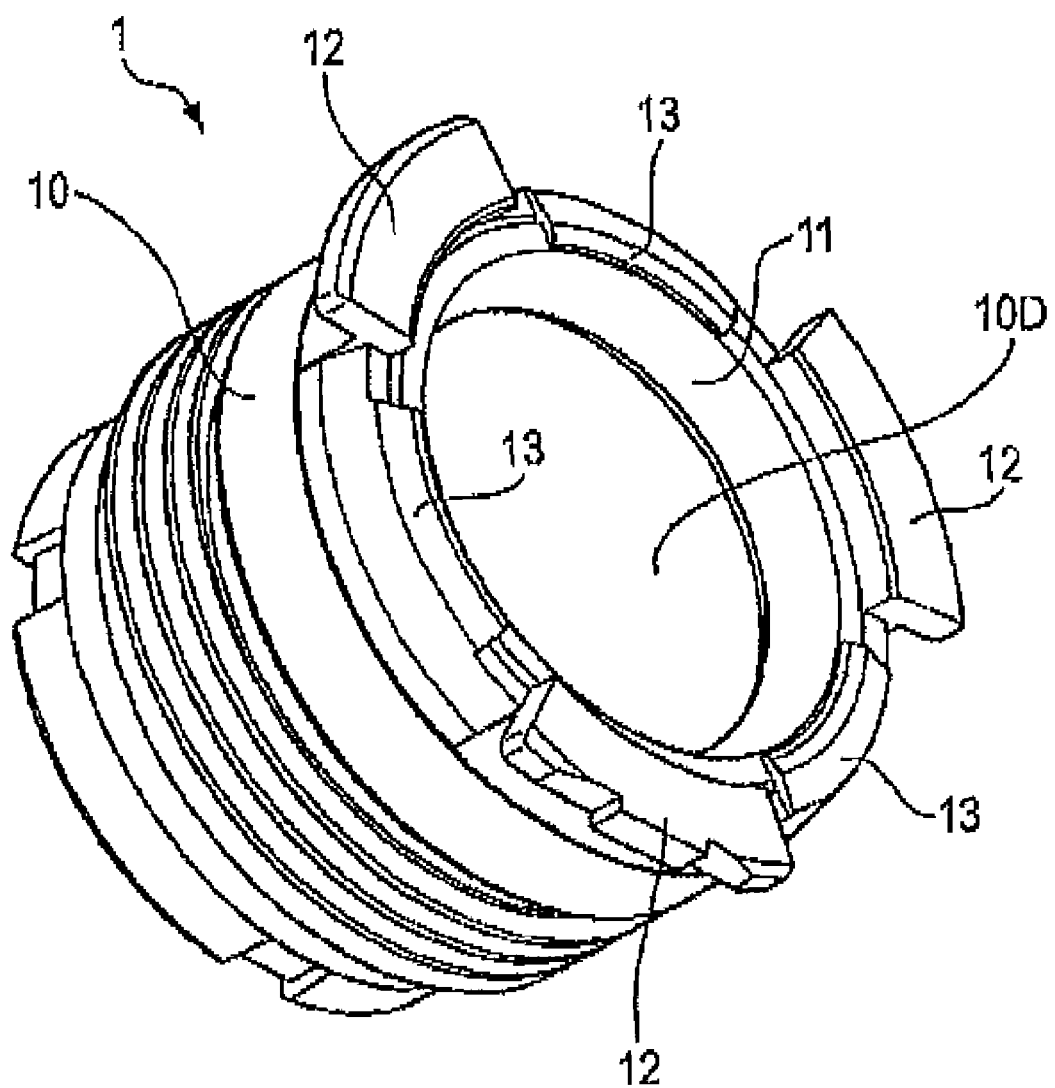
FIG. 5 shows an outer appearance of the lens holder 10 after thermal caulking is performed.

FIG. 3 is a view showing an outer appearance of the lens assembly 1 used in the camera-equipped mobile phone 3 of FIG. 2 before thermal caulking is performed. FIG. 4 is a front view, a side view, a D-D arrow view, and a rear view of the lens assembly 1 of FIG. 3 when the right of the lens assembly 1 of FIG. 3 is the front side. FIG. 5 is a view showing an outer appearance of the lens assembly 1 after thermal caulking is performed. FIG. 6 is a front view, a side view, a D-D arrow view, and a rear view of the lens assembly 1 of FIG. 5 when the left of the lens assembly 1 of FIG. 5 is the front side.

In FIGS. 3 and 5, the left of the drawings is a subject side, and the right of the drawings is an imaging element side. When forward and backward directions are described in the following description, the left of FIGS. 3 and 5 is forward and the right of FIGS. 3 and 5 is backward under a condition that the subject side is the forward side.

A lens holder 10 provided in the lens assembly 1 shown in FIGS. 3 to 6 is formed in a hollow structure. An opening is provided in each of a front end face and a rear end face of the lens holder 10. Lenses 10A to 10D of a four-group configuration are accommodated within the lens holder 10. An opening of the front end face of the lens holder 10 is a smaller diameter opening than an outer shape of the lens 10A arranged in the foremost end face side of the lens holder 10, and the lens 10A of the foremost end face is inserted into the lens holder to abut from a rear end face side to the smaller diameter opening side. Thereafter, the lens 10B of the second group, the lens 10C of the third group, and the lens 10D of the fourth group are inserted into the lens holder one after another.

In this embodiment, the lens 10D of the rear end face side is a plastic lens. Since the plastic lens is deformed when thermal caulking is performed from the rear end face side of the lens holder 10, the spacer ring 11 is inserted into a rear end face side of the lens 10D of the rearmost end face side of the lens holder 10, abuts on a peripheral portion of a lens rear face of the rearmost end face side, and keeps a space between the rear face and the rear end face.

Figure 1:
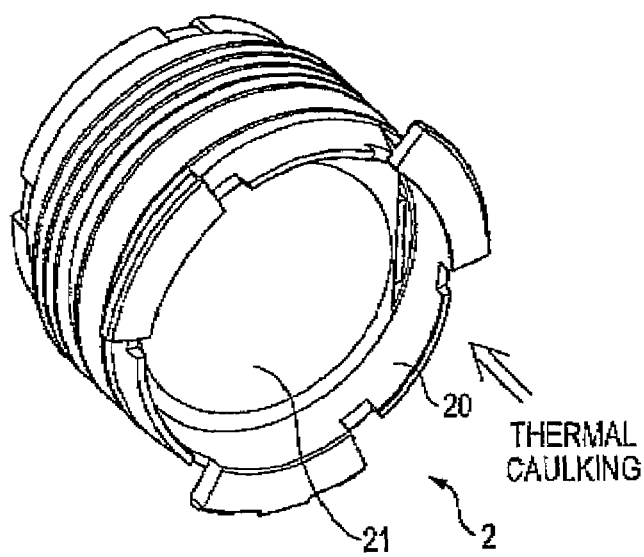
FIG. 1A shows a plastic lens 21 of a D-cut shape and FIG. 1B shows an outer appearance when the plastic lens 21 is placed in a rear end face.
Figure 1:
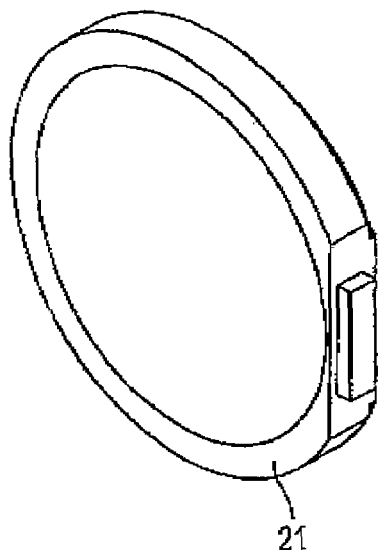

When the spacer ring 11 is inserted, the spacer ring 11 serves as a buffer member when thermal caulking is performed from the rear end face side. It is difficult for the heat to be transferred to the plastic lens even when the lens 10D of the rear end face side is the plastic lens. Since the flatness of the rear end face is maintained by the face of the spacer ring by inserting the spacer ring 11 even if the lens 10D of the rear end face side is the plastic lens of the D-cut shape as shown in FIG. 1, there does not occur the case where the holder is bumpy and the holder itself is deformed even when a leading end portion of a caulking tool is caught in any portion.

Moreover, reference planes 12 are provided in the rear end face of the lens holder 10. The reference planes 12 serving as a basis for optical position adjustment of the lens group, intermittently surround the opening of the rear end face. Since claws 13 for thermal caulking are provided between the reference planes 12, the face of the claws 13 is almost the same as the rear end face of the spacer ring 11 as shown in FIGS. 5 and 6 when the claws 13 for thermal caulking are caulked by the caulking tool. The lenses 10A to 10D of the four-group configuration and the spacer ring 11 are arranged within the rear end face of the spacer ring 11, such that the optical axis of each lens can be accommodated within the lens holder in a state in which the optical axis is oriented in a direction almost orthogonal to the reference plane 12.

FIGS. 5 and 6 show a state of a lens assembly after the claws 13 for thermal caulking is caulked by the caulking tool.

Figure 6A:
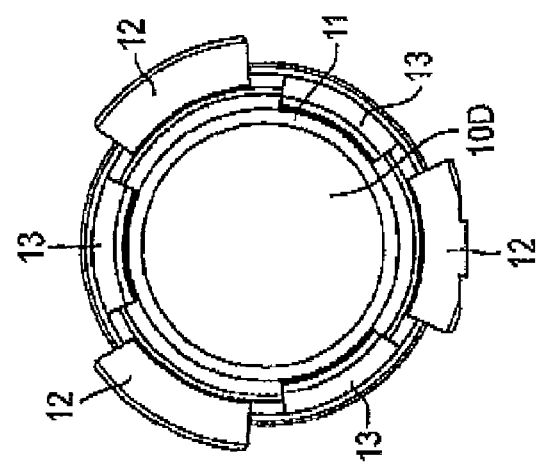
FIG. 6 is a front view, a side view, a D-D arrow view, and a rear view of the lens holder 10 of FIG. 5, respectively, when the right of the lens holder 10 of FIG. 4 is the front side.
Figure 6B:
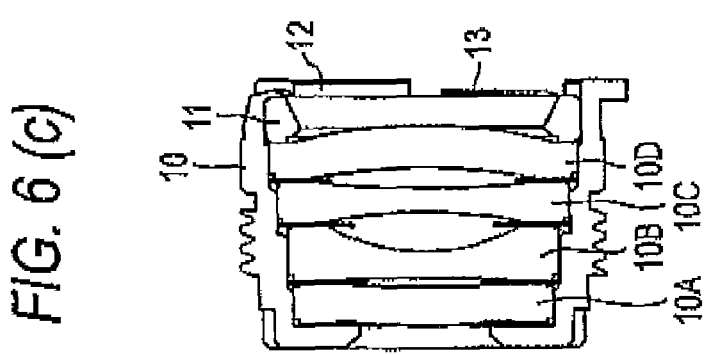
Figure 6C:
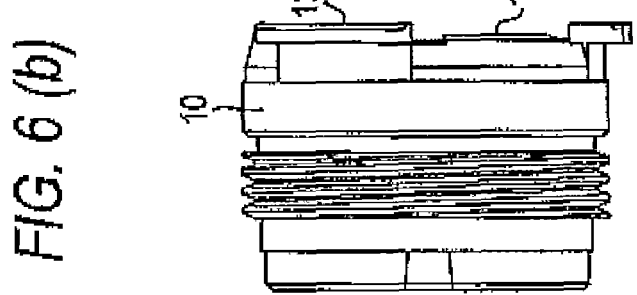
Figure 6D:
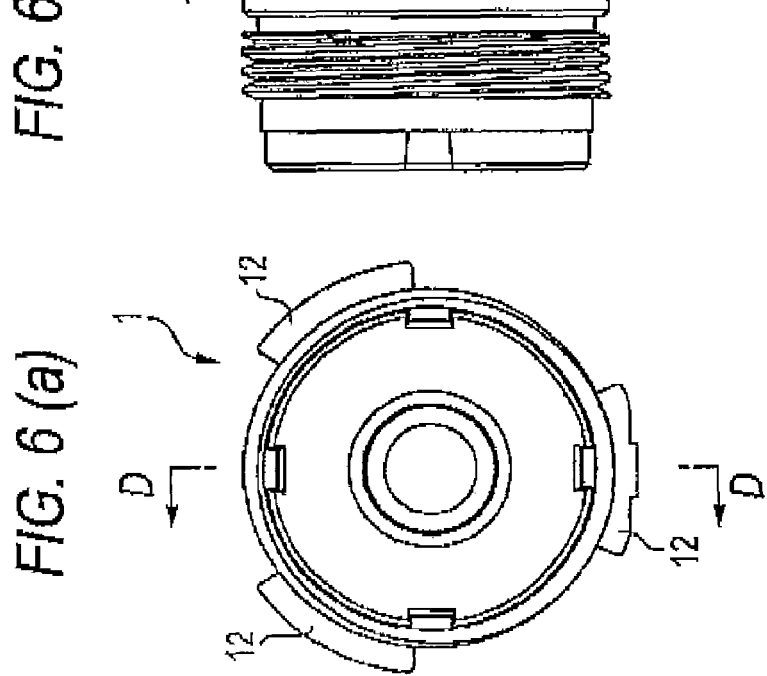

Since the spacer ring 11 is held within the lens holder 10 such that the rear end face of the spacer ring 11 is almost the same as the reference planes of the lens holder 10 through the claws 13 laid on the reference planes 12 as shown in FIG. 5 and FIG. 6C, a plurality of lens groups are aligned within the lens holder 10 and simultaneously are correctly accommodated in a state in which the optical axes of the lenses are oriented in the same direction.

As described above, a lens assembly is realized in which thermal caulking can be performed even when a plastic lens is located within a lens holder.

This application claims foreign priority from Japanese Patent Application No. 2007-55076 filed Mar. 6, 2007, the contents of which is herein incorporated by reference.

What is claimed is:

1. A lens assembly comprising:
  a plurality of lenses; and
  a lens holder accommodating the plurality of lenses and having an opening in each of a front end face of the lens holder and a rear end face of the lens holder,
  wherein the opening of the front end face has a smaller diameter than an outer diameter of a foremost lens accommodated in a foremost end face side of the lens holder,
  the lens holder includes a spacer ring disposed on a rear side of a rearmost lens accommodated in a rearmost end face side of the lens holder, the spacer ring abutting on a peripheral portion of the rearmost lens to keep a space between a rear face of the rearmost lens and the rear end face of the lens holder, and
  the lens holder holds a rear face of the spacer ring by thermal caulking.

2. The lens assembly according to claim 1, wherein the lens holder has a plurality of reference planes in the rear end face of the lens holder, the plurality of reference planes intermittently surrounding the opening of the rear end face and serving as a basis for optical position adjustment of the plurality of lenses, and the lens holder holds the spacer ring by thermal caulking between the reference planes.

3. The lens assembly according to claim 1, wherein at least the rearmost lens is a plastic lens.

4. An imaging device comprising: a lens assembly according to claim 1; and an imaging element.

* * * * *